US012272323B1

(12) United States Patent
Kim et al.

(10) Patent No.: US 12,272,323 B1
(45) Date of Patent: Apr. 8, 2025

(54) DISPLAY LIGHT COMPENSATION

(71) Applicant: Ford Global Technologies, LLC, Dearborn, MI (US)

(72) Inventors: Dongwoo Kim, South Lyon, MI (US); Mark Larry, Macomb, MI (US); Biaohe Guo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/680,452

(22) Filed: May 31, 2024

(51) Int. Cl.
*G09G 3/34* (2006.01)

(52) U.S. Cl.
CPC ..... *G09G 3/3426* (2013.01); *G09G 2300/026* (2013.01); *G09G 2320/0233* (2013.01); *G09G 2320/0646* (2013.01); *G09G 2320/0666* (2013.01); *G09G 2320/0686* (2013.01); *G09G 2360/16* (2013.01)

(58) Field of Classification Search
CPC . G09G 3/3406–3426; G09G 2300/026; G09G 2320/0233; G09G 2320/0646; G09G 2320/0666; G09G 2320/0686; G09G 2360/16
See application file for complete search history.

(56) References Cited

U.S. PATENT DOCUMENTS

| | | | | |
|---|---|---|---|---|
| 10,249,251 B2 * | 4/2019 | Yata | G09G 5/10 | |
| 10,497,319 B2 * | 12/2019 | Nakanishi | G09G 3/34 | |
| 11,398,195 B2 | 7/2022 | Wang et al. | | |
| 2010/0110112 A1 * | 5/2010 | Nakanishi | G09G 3/3426 | 345/690 |
| 2011/0304657 A1 * | 12/2011 | Yamamura | G09G 3/3426 | 345/690 |
| 2023/0148119 A1 | 5/2023 | Heo et al. | | |

FOREIGN PATENT DOCUMENTS

| | | |
|---|---|---|
| CN | 108873399 A | 11/2018 |
| JP | 2007279213 A | 10/2007 |

OTHER PUBLICATIONS

Poulin, F. et al., "Display Measurement," Ebu Technical Review, 2009, 9 pages.

* cited by examiner

*Primary Examiner* — Gene W Lee
(74) *Attorney, Agent, or Firm* — Frank Lollo; Brooks Kushman P.C.

(57) ABSTRACT

A computing device may determine a first illumination value based on a first sub-area of an image of a display. The display may include LED zones. The first sub-area may be centered on the image. The computer may define a plurality of second sub-areas of the image based on the LED zones, determine second illumination values of the second sub-areas, compare the second illumination values to a value range, the value range being defined by at least one of an addition and a subtraction of the first illumination value and a threshold value, and actuate the display based on comparing the second illumination values to the value range.

20 Claims, 9 Drawing Sheets

DISPLAY LIGHT COMPENSATION

BACKGROUND

Systems may be operated by acquiring sensor data, including data regarding system status and data regarding an environment around the system. The data may be formatted and outputted via a display for users to view and interact with. The display may be a liquid crystal display (LCD) using light-emitting diodes (LEDs). The display can display a wide variety of data including, but not limited to, vehicle control screens; vehicle status data such as vehicle speed, energy usage, and other vehicle service notices; data regarding the environment around the vehicle such as traffic and navigation maps; etc.

DETAILED DESCRIPTION

Figure 1:
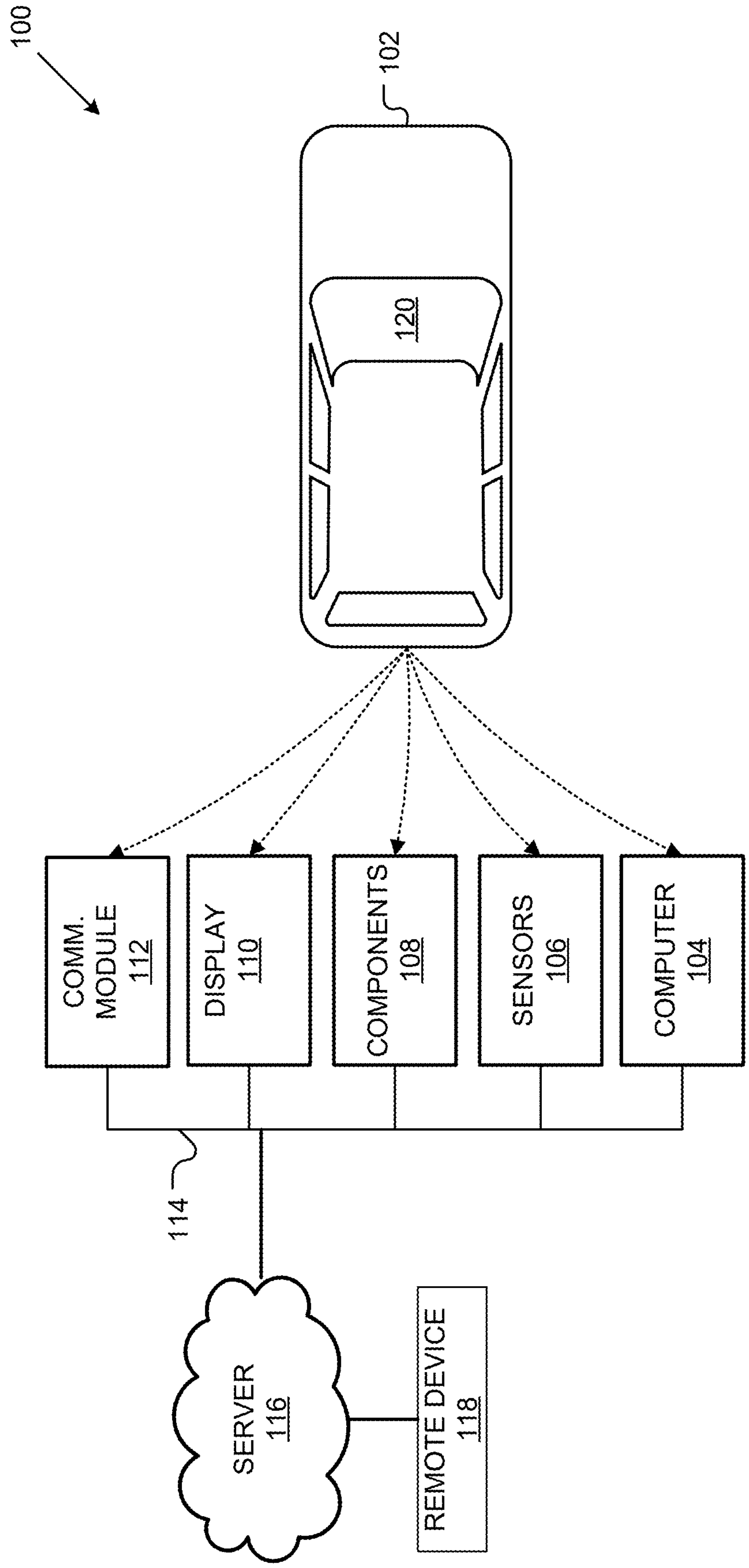
FIG. 1 is a block diagram illustrating an example vehicle system.

Techniques described herein can detect local illumination values and actuate a display based on the illumination values. A computer may capture an image of a display screen and divide the image into a number of sub-areas. The computer can enhance the operation of a display by actuating the display based on the illumination values. In examples herein; the described display is a vehicle display, and vehicle operation will be used herein as a non-limiting example environment for implementing systems and methods described herein. However, other implementations are possible, such as consumer electronics displays, industrial machine displays, etc. Thus, it will be understood that techniques described herein may be applicable in non-vehicular environments.

Displays can output data for an occupant to view by utilizing arrangements of light-emitting-diodes (LED's). LED's may operate outside of specified parameters (e.g. operate at a luminance or chromaticity outside of a specified range), or cease to operate as a result of passage of time, faulty manufacturing, incorrect installation specifications, etc. Such LED's may negatively affect the occupant's ability to view the data being outputted by the display. Computers can use sensor data to control displays without requiring intervention by users. For example, the computer can control display brightness and color based on sensors that detect illumination values such as luminance, chromaticity, etc. Thus, computers may actuate LED's based on sensor data to address operations that may otherwise be outside of specified parameters. For example, a display in a vehicle may experience variation in LED output and/or occupant perception of the display that can be addressed by techniques described herein.

Accordingly, included in the present disclosure is a system comprising a computing device, the computing device including a processor and a memory, the memory storing instructions executable by the processor, including instructions to: determine a first illumination value based on a first sub-area of an image of a display, the display including LED zones, the first sub-area being centered on the image; define a plurality of second sub-areas of the image based on the LED zones; determine second illumination values of the second sub-areas; compare the second illumination values to a value range, the value range being defined by at least one of an addition and a subtraction of the first illumination value and a threshold value; and, based on comparing the second illumination values to the value range, actuate the display.

The computing device may assign the second sub-areas a uniformity value, the uniformity value being based on the value range.

The uniformity value may be the result of dividing the second illumination values by the first illumination values.

The value range may be defined by a result of dividing the second illumination values by the first illumination values.

The value range may be defined by a result of dividing a summation of differences between second illumination values by a resolution of a camera.

The differences between second illumination values may be found by subtracting, from the second illumination values of the second sub-areas, the second illumination values of the second sub-areas after applying smoothing to the second illumination values.

The second illumination values may be luminance measured in nits.

The second illumination values may be chromaticity.

Actuating the display may include at least one of increasing or decreasing a brightness of some of the LED zones.

The computing device may remove a plurality of pixels from a border of the image prior to determining the first illumination value.

A method comprises: determining a first illumination value based on a first sub-area of an image of a display, the display including a liquid crystal display (LCD) backlit by light emitting diodes (LEDs) arranged in LED zones, the first sub-area being centered on the image; defining a plurality of second sub-areas of the image based on the LED zones; determining second illumination values of the second sub-areas; comparing the second illumination values to a value range, the value range being defined by at least one of an addition and a subtraction of the first illumination value and a threshold value; and, based on comparing the second illumination values to the value range, actuating the display.

The second sub-areas may be assigned a uniformity value, the uniformity value being based on the value range.

The uniformity value may be the result of dividing the second illumination values by the first illumination values.

The value range may be defined by a result of dividing the second illumination values by the first illumination values.

The value range may be defined by a result of dividing a summation of differences between second illumination values by a resolution of a camera.

The differences between second illumination values may be found by subtracting, from the second illumination values of the second sub-areas, the second illumination values of the second sub-areas after applying smoothing to the second illumination values.

The second illumination values may be luminance measured in nits.

The second illumination values may be chromaticity.

Actuating the display may include at least one of increasing or decreasing a brightness of some of the LED zones.

A plurality of pixels may be removed from a border of the image prior to determining the first illumination value.

Figure 2:
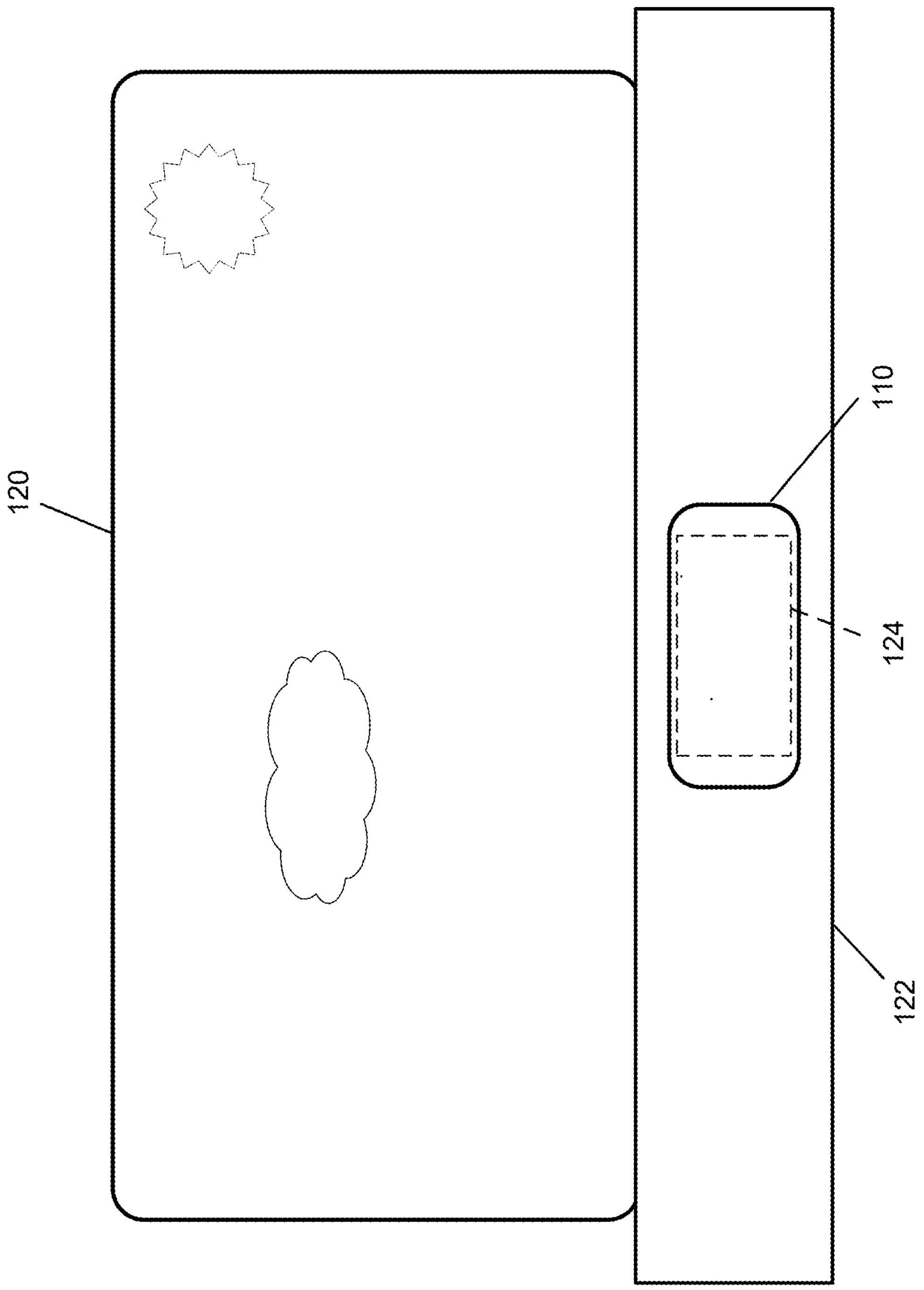
FIG. 2 illustrates an example display.

Referring to FIGS. 1 and 2, a vehicle system 100 is illustrated. The vehicle 102 includes a computer 104 having a memory that includes instructions executable by the computer 104 to carry out processes and operations including as described herein. The computer 104 may be communicatively coupled via a communication network, such as a vehicle network 114, with sensors 106, components 108, a display 110, and a communication module 112 in the vehicle 102. The vehicle 102 includes at least one window 120. The vehicle 102 may be any passenger vehicle such as a car, a truck, a sport utility vehicle, a crossover, a van, a minivan, a taxi, a bus, ICE (Internal Combustion Engine), BEV (Battery Electric Vehicle), hybrid, a PHEV (Plug-in Hybrid Electric Vehicle), etc.

A computer such as the vehicle computer 104 (referred to below as "vehicle computer 104" or "computer 104") includes a processor and a memory. The memory includes one or more forms of computer readable media, and stores instructions executable by the computer 104 for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in a computer 104.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle components 108 such as propulsion (e.g., control of speed in the vehicle 102 by controlling one or more of an internal combustion engine, electric motor, hybrid engine, etc.), steering, interior and/or exterior lights, HVAC, HUD lighting, etc., as well as to determine whether and when the computer 104, as opposed to a human operator, is to control such operations.

The computer 104 may include or be communicatively coupled to (e.g., via the vehicle network 114 such as a communications bus) more than one processor (e.g., included in components 108 such as sensors 106, electronic control units (ECUs) or the like included in the vehicle 102 for monitoring and/or controlling various vehicle components 108 (e.g., a powertrain controller a steering controller, etc.) The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices and/or components 108 in the vehicle 102 and/or receive messages (e.g., CAN messages) from the various devices and/or components 108 (e.g., sensors 106, ECUs, etc.) Alternatively, or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The display 110 renders visual data for viewing by users. The display 110 is described herein with respect to a non-limiting example of vehicle operations, though it will be understood that the systems and methods described herein may be performed in other environments (e.g. personal computing displays, mobile phone displays, etc.) In examples where the display 110 is a vehicle display 110, the users are typically vehicle occupants. The display may be supported by a dashboard 122 of the vehicle 102. The display 110 can display visual data in monochrome or color and the visual data can be updated at a frame rate, which can be 60 frames per second, for example. Displayed visual data can be a static image, where the majority of the area does not change from frame to frame, or a dynamic image, where the majority of the area changes from frame to frame. The display may be a liquid crystal display (LCD) and/or may utilize light emitting diodes (LEDs). For example, the display may be an LCD that is backlit by LED's.

Backlighting by LEDs includes using an array of LEDs arranged in LED zones. Each LED zone can include one or more LEDs. For example, LED zones can include red, green, and blue LEDs that combine to create color backlighting, including white light. LEDs in LED zones can be controlled separately to generate backlighting patterns or to address improperly operating LEDs to support the display. LEDs in LED zones can be energized to different amounts of illumination values. Some displays 110 may not necessarily have specified LED zones (e.g. edge-lit LCD's, OLED displays, micro-LED displays, etc.). In such cases, the computer 104 may assign "imaginary" LED zones. Imaginary LED zones as used herein means LED zones created by the computer 104 and assigned to a display 110 for purposes of applying or utilizing techniques described herein where the display does not actually utilize specified or physical LED zones. The computer 104 may actuate LEDs in the imaginary display zones in the same manner as it would actuate LEDs that were actually assigned to specified LED zones.

The vehicle communication module 112 allows the vehicle computer 104 to communicate with a remote device 118 of the server 116 by way of example, a messaging or broadcast protocol such as Dedicated Short Range Communications (DSRC), Cellular Vehicle-to-Everything (C-V2X), Bluetooth® Low Energy (BLE), Ultra-Wideband (UWB), Wi-Fi, cellular, and/or other protocol that can support vehicle-to-vehicle, vehicle-to-structure, vehicle-to-cloud communications, or the like.

Sensors 106 may include a variety of devices such as are suitable to provide data to the vehicle computer 104. Sensors 106 may collect data related to the vehicle 102 and the environment in which the vehicle 102 is operating. By way of example, and not limitation, sensors 106 may include, i.e., altimeters, cameras, LIDAR, radar, ultrasonic sensors, infrared sensors, pressure sensors, gyroscopes, temperature sensors, hall sensors, optical sensors, voltage sensors, current sensors, mechanical sensors such as switches, etc. The sensors 106 may sense the environment in which the vehicle 102 is operating (i.e., sensors 106 can detect phenomena such as weather conditions (precipitation, external ambient temperature, etc.), the grade of a road, the location of a road (i.e., based on road edges, lane markings, etc.), or locations of target objects such as neighboring vehicles 102). In an example where the sensor 106 is a camera, the sensor 106 may have a field of view which defines a space which may be captured in an image 124 (see FIG. 3) by the sensor 106. In examples used herein, the space captured by the image 124 is of the display 110. That is, the image 124 may be of the screen of the display 110. The image 124 may be a digital image and, therefore, may be comprised of pixels corresponding to a resolution of the sensor 106.

Some sensors 106 may be illumination sensors that may further be used to collect data including illumination values of the image 124 captured by the sensor 106. Illumination values are values which quantify perceivable or detectable characteristics or attributes of light using any suitable unit of measurement. Illumination values may, for example, quantify or describe luminance (e.g. luminous intensity per unit area) measured in nits. Nit is a unit of measurement of luminance (i.e., a total amount of visible light emitted by a source) per unit area. 1 nit is equal to 1 candela per square meter.

Illumination values may further quantify or describe chromaticity. Chromaticity specifies a quality of a color. Chromaticity includes hue and saturation. Chromaticity may be expressed on a two-dimensional diagram such as CIE1931 color space or CIE1976 color space which are graphs that quantifiably relate distributions of wavelengths in the visible spectrum to physiologically perceived colors in human vision. (CIE 1931 and CIE 1976 are diagrams developed and maintained by the International Commission on Illumination, available at https://cie.co.at/publications/international-standards at the time of filing this disclosure.) Red, green, and blue colors include an x, y, and z component on the diagrams. Colors that appear to be more red may have a higher "x" value whereas colors that appear to be more green may have a higher "y" value.

The sensor 106 may measure illumination values (such as luminance) by any suitable means. For example, illumination values may be measured by one or more photodiodes for luminance and one or more colorimeters for chromaticity.

The vehicle computer 104 can be programmed to receive data from one or more sensors 106, e.g., substantially continuously, periodically, and/or when instructed by the remote device 118, etc. Image data herein means digital image data, i.e., comprising pixels, typically with intensity and color values, that may be acquired by cameras. The sensors 106 may be mounted to any suitable location in or on the vehicle 102 (e.g., on a vehicle 102 dashboard 122, on a rear-view mirror, etc.) to collect images 124.

The computer 104 can acquire data from sensors 106, remote device 118 and memory included in computer 104 and format the acquired data into an image 124 that is compatible with display 110. The formatted image 124 can be transmitted to a display controller included in computer 104 to actuate display 110. The display controller can transmit the image 124 to display 110 with timings and voltages to generate an image 124 with indicated intensity and contrast for viewing on display 110 by users. For example, computer 104 can acquire data regarding the speed of a vehicle 102 from sensors 106 that measure the rotation of vehicle wheels. A number indicating the vehicle's speed can be formatted into an image 124 which is then transmitted to the display controller included in computer 104 to acuate a display 110 that functions as a vehicle speedometer.

The remote device 118 may be a conventional computing device, i.e., including one or more processors and one or more memories, programmed to provide operations such as disclosed herein. Further, the remote device 118 may be accessed via the server 116, e.g., the Internet, a cellular network, and/or or some other wide area network.

Figure 3:
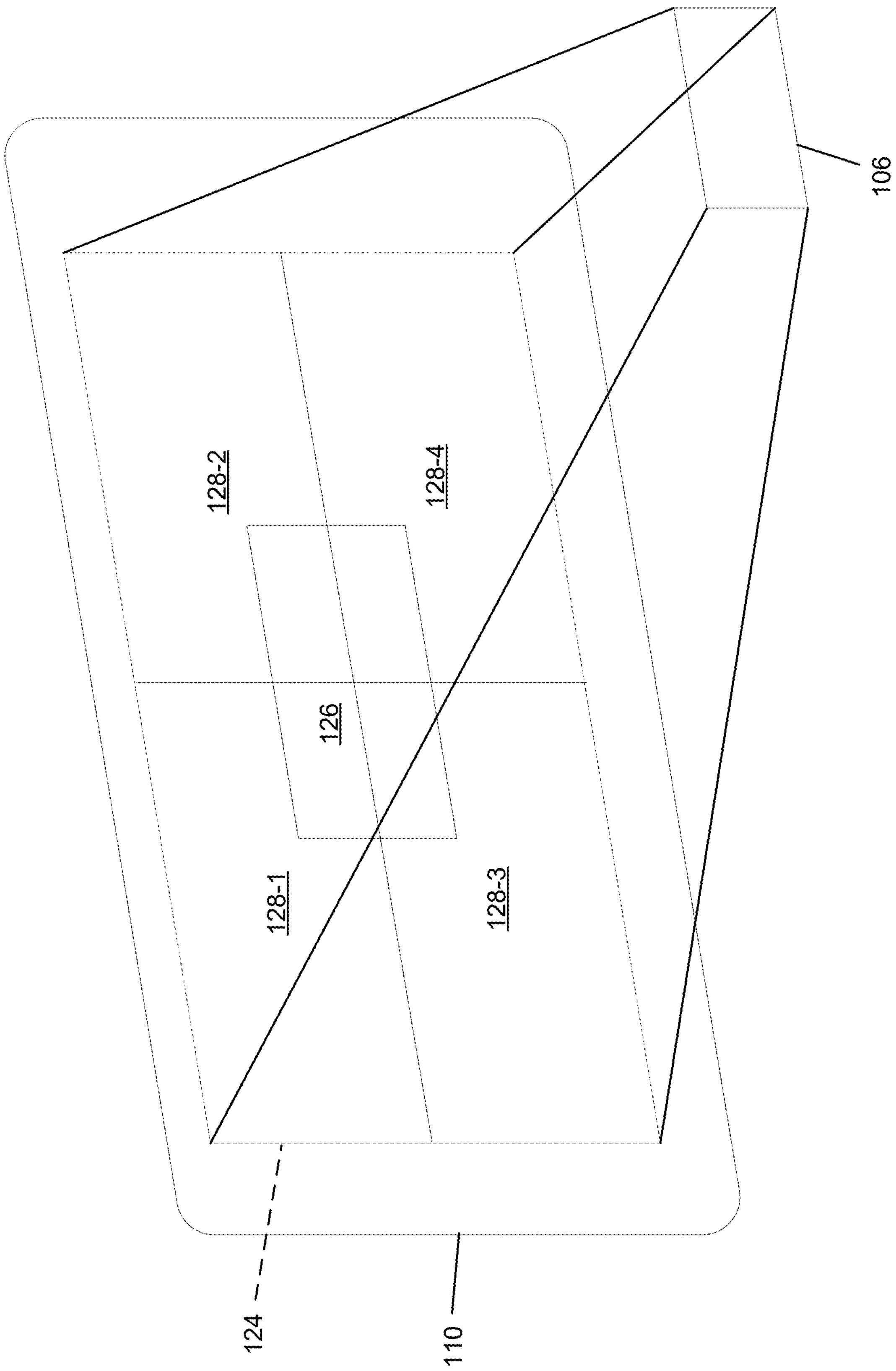
FIG. 3 illustrates an example image of the display with sub-areas.

Referring now to FIG. 3, along with FIGS. 1-2, the image 124 of the display 110 captured by the sensor 106 is shown. That is, the sensor 106 may capture the image 124 of the display 110. The sensor 106 may be positioned on or in any suitable surface such that the entire screen of the display 110 may be captured in the image 124. In examples where the display 110 is a vehicle display, the computer 104 may be positioned in or on any suitable location in the vehicle 102. Alternatively, the sensor 106 may be a separate device from the vehicle 102 and positioned to capture the image 124 by a suitable mounting and/or by a user.

The computer 104 may obtain images 124 captured by sensors 106 via the network 114. In examples, the computer 104 may actuate (or command actuation of) the sensor 106 via the network 114 to capture the image 124. The computer 104 may further actuate the sensor 106 to capture a plurality of images 124 over a specified time. Respective images 124 have acquisition times based on the time when the image 124 was captured. Images 124 may be assigned timestamps based on time of capture.

The sensor 106 may periodically capture images 124 based on a specified passage of time and/or a specified conditions or conditions being met. For example, as long as the vehicle 102 is being operated (e.g. the vehicle ignition is on), the sensor 106 may capture a new image 124 every 1/60 seconds (one-sixtieth of a second), such that the sensor 106 may achieve a framerate of 60 frames per second. The sensor 106 may make the images 124 available to components 108 via the vehicle network 114 as they are captured.

The computer 104 may collect a plurality of images of the display 110 over a specified time. Each image 124 may have an acquisition time respectively. That is, the computer 104 may actuate the sensor 106 to capture a plurality of images 124 of the display 110. The computer 104 may actuate the sensor 106 to capture a specified number of images 124 within a specified time and may also actuate the sensor 106 to continuously (e.g., spaced apart only by a specified amount of time) capture images 124 while the vehicle 102 is operating. In addition to capturing a plurality of images 124, the computer 104 may measure the first illumination value and second illumination values for each image 124 respectively.

The computer 104 may compensate for saturation, gain, and exposure time of the image 124. That is, after the image 124 is captured and before the first illumination value is measured, the computer 104 may compensate for saturation, gain, and exposure time. As an example, the computer 104 may store an algorithm for applying compensation to images 124. Once the image 124 is captured the computer 104 may input the image to the stored algorithm.

The algorithm may utilize a machine learning program such as a deep neural network. The neural network may compensate for factors such as saturation, gain, exposure time, etc., in images 124 such that the computer 104 may measure illumination values of the image 124 with better accuracy than would otherwise be achieved. The neural network may receive the image 124 before compensation as an input, predict factors in the image 124 that are to be compensated for, and output the image with the factors compensated for. The neural network may be trained to identify and compensate for (e.g. remove or adjust) the factors based on a training process. In training a deep neural network, a training dataset that includes example images 124 with various factors may be used. The training dataset can include thousands of examples images 124, each of which includes ground truth data that indicates the factors present in the image 124. The deep neural network can be executed on the dataset of training images 124 multiple times, where each time the deep neural network is executed the output prediction is compared to the ground truth to determine a loss function. The loss function can be back-propagated through the deep neural network from output layers to input layers to adjust weights which govern processing for each layer to minimize the loss function. When the loss function reaches a user-determined minimum for the training dataset, the deep neural network training can be deemed complete, and the weights indicated by the minimum loss function may then be stored with the trained deep neural network.

The computer 104 may crop the image 124. That is, the computer 104 may decrease the size of the image 124 by removing specified pixels. Typically, the pixels to be removed may be pixels on the border of the image 124. For example, the computer 104 may crop all pixels within 3 mm of the edge of the image 124. As the image 124 is an image 124 of the display 110, pixels near the border of the image 124 may be pixels which represent the edge of the display 110. Illumination values may become distorted towards the edge of the display 110 as a result of imperfect operation of the LEDs in those LED zones that are positioned towards the edge of the display 110. For example, those LED zones which are positioned closer to the center of the display may benefit from the illumination of LEDs in adjacent LED zones, whereas those LED zones near the edge of the display 110 may operate without the same amount of contributing illumination of adjacent LED zones. Additionally, the image 124 may include portions of the dashboard 122 surrounding the display 110. Such portions may be removed by cropping an appropriate amount of pixels.

The amount (or number) and locations of pixels to be cropped from the image 124 may be determined by empirical testing. For example, during a development phase, the computer 104, or a similarly situated computer 104 in a vehicle 102 designated for testing purposes, may capture a plurality of images 124 and crop varying numbers of pixels from the image 124. The minimum number of cropped pixels that results in only the display 110 being within the image 124 may be selected as the number of pixels to be cropped by the computer 104 during normal operation.

The computer 104 may define sub-areas of the image 124. The sub-areas may include a first sub-area 126 and second sub-areas 128-1, 128-1, 128-3, 128-4 (collectively sub-areas 128, described in further detail below). The image 124 is comprised of pixels that can be represented and/or stored as an array. The computer 104 may divide the image 124 into a plurality of sub-areas that respectively include less pixels than the whole image 124. For example, if the image 124 has a resolution of 1920×1080 pixels, the image 124 would include 2,073,600 pixels. The first-sub area may be only a portion of those pixels. Each sub-area 126, 128 may be of equal size (e.g. the same resolution) or may differ in size (e.g. have a different resolution). The first sub-area may be defined such that the center of the first sub-area is the center of the image 124 (as is shown).

The computer 104 may measure a first illumination value of the first sub-area 126 of the image 124. As mentioned above, the first illumination value (and second illumination value) may be luminance measured in nits, or may specify chromaticity. To measure the first illumination value, the computer 104 measures either luminance or chromaticity over the pixels included in the first sub area 126. The computer 104 may measure the first illumination value using an illumination sensor 106, mentioned above. The computer 104 may determine the illumination values of the sub-areas 126, 128 by measuring the illumination values in each pixel of each sub-area 126, 128, calculating the average illumination value, and applying the average illumination value to the entire sub-area 126, 128 respectively.

The computer 104 may define second sub-areas 128 of the image 124. The second sub-areas 128 may be separate from the first sub-area 126 (e.g. one ore more of the second sub-areas 128 may share a border with the first sub-area 126 but not overlap) or may overlap with the first sub-area 126 (e.g. one or more of the second sub-areas 128 may include pixels of the image 124 that are also included in the first sub-area 126) as is shown. The computer 104 may define the second sub-areas 128 based on the specification of the sensor 106. For example, the computer 104 may store a lookup table or the like specifying the pattern (e.g. size and arrangement) of second sub-areas 128 specified for operation of a given sensor 106. As used herein, a “lookup table” means a data table or the like that relates certain inputs to certain outputs. The lookup table may be compiled or generated based on empirical testing and/or simulation. For example, the lookup table may specify a minimum number of second sub-areas required to provide accurate data as determined during a development phase such that computing power may be saved. Continuing with the example, the computer 104 may define varying patterns of second sub-areas 128 of the image 124. The pattern to be used for the second sub-areas 128 may be that pattern which provides sufficient data whilst minimizing the number of second sub-areas as defined by those developing the computer 104.

The computer 104 may measure second illumination values of the second sub-areas 128. That is, where the first illumination value corresponds to the first sub-area 126, the second illumination values may correspond respective second sub-areas 128 of the image 124. Second illumination values, like first illumination values, may be specified in units of nits (i.e., luminance). The second illumination values may be measured using any suitable method as described above relating to the measurement of the first illumination values. The computer 104 may measure the second illumination values after the computer 104 has compensated for gain, exposure time, etc.

The computer 104 may compare the second illumination values to a uniformity value range. "Uniformity" with respect to illumination values herein means a measure of sameness or similarity of illumination values between different sub-areas 126, 128. For example, where all sub-areas 126, 128 show the same illumination value, the sub-areas 126, 128 would be perfectly or completely uniform. As sub-areas 126, 128 progressively begin to differ in illumination values, the uniformity correspondingly would decrease. A uniformity value range, as that term is used herein, means a range of values in which the illumination values of sub-areas 126, 128 should fall to be deemed uniform. As explained further below, uniformity value ranges can be determined according to various mathematical expressions or formulae. The formulae are utilized to calculate uniformities of a display 110, including white luminance uniformity, black luminance uniformity, white color uniformity, and grid-mura luminance uniformity. Luminance uniformity means a metric that characterizes the changes in luminance over the surface of the display 110 (e.g., how uniform the luminance values of the sub-areas 126, 128 are). Color uniformity means how much each LED zone shows color differences with respect to the center LED zone (e.g., how uniform the chromaticity values of the sub-areas 126, 128 are). Respective uniformity value ranges will be described in turn below.

A uniformity value range may be defined by at least one of adding or subtracting the first illumination value to and/or from a threshold value (e.g., the uniformity value range for black luminance uniformity). The threshold value may differ for each of the uniformity value ranges. Respective threshold values will also be described in turn below.

The computer 104 may compare the second illumination values to the value range. That is, the computer 104 may compare the second illumination values to the result of the mathematical operation that is the value range for each uniformity. For example, the second illumination values may be determined based on how close they are to the result of the value range. How the second illumination values are compared to the value range will be described for each uniformity in turn below.

The computer 104 may actuate the display 110 based on comparing the second illumination values to the value range. That is, the computer 104 may actuate the LEDs within the LED zones (e.g. by adjusting brightness, color, etc.) based on the second illumination values of each second sub-area 128. How the display 110 may be actuated based on comparing the second illumination values to the value range will be described for each uniformity in turn below. For example, the computer 104 may increase or decrease brightness of LED's, adjust offset illumination values of LED's, apply normalizing ratios to LED's, etc.

The computer 104 may calculate the white luminance uniformity of the display 110. The computer 104 may actuate all display zones to output white light, capture the image 124, and crop the image 124. The computer 104 may measure the luminance of the first sub-area 126 as the first illumination value. The first illumination value may be the average luminance value measured across all pixels included in the first sub-area 126. The computer 104 can then measure the luminance of the pixels in the second sub-areas 128 and add them together (i.e., find their sum) before dividing by the total number of values (e.g. finding the average) to find the second illumination values. The computer 104 then can input the first illumination value and second illumination values to equation 1:

$$\text{Uniformity Value} = \text{second illumination value}/\text{first illumination value} \quad \text{Equation 1}$$

Each second sub-area 128 may have respective uniformity values. The uniformity value represents the ratio of each second illumination value to the first illumination value. The uniformity value may be compared to a uniformity threshold. If the uniformity value of a sub-area 128 is above the uniformity threshold, the computer 104 determines the sub-area 128 to have not passed and may actuate the LED zones of the second sub-area 128 accordingly as described below. As an example, if the uniformity value of a second sub-area 128 is 98.6 and the uniformity threshold is 95, then the computer 104 may determine the second sub-area 128 to have passed.

The uniformity threshold may be determined by empirical testing during a development phase of the computer 104. For example, during the development phase, a uniformity threshold may be selected based on how close the second illumination values of the second sub-areas 128 are desired to be. If more precision is desired, the uniformity threshold may be higher (e.g. 99) whereas if more variation is acceptable, the uniformity threshold may be lower (e.g. 80). More variation may be acceptable or desirable if, for examples, it is determined that the larger variation allowed by the lower uniformity threshold is small enough as to not be noticeable by a typical user, thereby saving the time that may otherwise be needed to actuate the LEDs such that they operate within a heightened uniformity threshold.

The computer 104 may, in response to second sub-areas 128 uniformity value being below the uniformity threshold, actuate the LED zones associated with the respective second sub-areas 128. The computer 104 may actuate the LED zones by increasing the luminance of the LEDs in the LED zone (e.g. by increasing voltage supplied to the LEDs) of sub-areas 126, 128 which were determined to not pass. Alternatively, the computer 104 may decrease the luminance of the LEDs in other LED zones of sub-areas 126, 128 which were determined to pass (e.g. where the not passing sub-area's LEDs are already operating at maximum voltage). The computer 104 may increase or decrease illuminance by a rules-based system specifying an amount to adjust the LEDs when sub-areas 128 are determined to not pass. The rules may be determined during an empirical testing phase mentioned above. The amount of adjustment may be selected as balancing precision of adjustment (e.g. making smaller adjustments to achieve greater uniformity) with time (e.g. a larger adjustment may result in slightly less uniformity than smaller adjustments but may need to be performed less times). For example, the computer 104 may increase the luminance of the LEDs of a not passing sub-area 126, 128 by 5% (or any percentage as specified during development) and repeat the measurements.

Similar to calculating white luminance uniformity, the computer 104 may calculate black luminance uniformity. The computer 104 may actuate the display 110 to output a grey pattern (e.g. a 2G pattern via outputting RGB 2:2:2), capture the image 124, crop the image 124, define the first sub-area 126, measure the first illumination value (e.g. luminance), define the second sub-areas 126, and measure the second illumination values (e.g. luminance) as described above with respect to white luminance uniformity. The computer 104 may also output a black pattern (e.g., for edge lit displays) instead of or in addition to the grey pattern (e.g., by outputting RGB 0:0:0). The computer 104 may then apply the black luminance uniformity value range and the compare the second illumination values based on expression 1:

$$\text{First Illumination Value}-B_{th}<\text{Second Illumination Value}<\text{First Illumination value}+B_{th} \qquad \text{Expression 1:}$$

where $B_{th}$ is a threshold luminance value. When the second illumination value is outside the range of Expression 1, the computer 104 may determine the second sub-area 128 as not passing and actuate the display accordingly. As an example, the computer 104 may adjust an offset illumination value (e.g. a value added to equally increase the illumination values of all pixels) for those pixels in sub-areas 126, 128 which are determined to not pass. The offset illumination value is a value that can be added to each pixel's illumination value before displaying the image. The computer 104 can reduce or increase the offset for those pixels of sub-areas 126, 128 which are determined to not pass by being outside of the value range specified by Expression 1. The computer 104 may decrease or increase the offset by a predetermined amount selected during a development phase of the computer 104. The computer 104 may then repeat the measurements after adjusting the offset and, if any sub-areas 126, 128 not pass again, further increase or decrease the offset. The computer 104 may adjust the offset and repeat measurements until all sub-areas 126, 128 are determined to be passing.

$B_{th}$ may be determined similarly to the uniformity value of white luminance uniformity. That is, $B_{th}$ may be selected during development of the computer 104 based on a desired uniformity of the second sub-areas 128. Where it is desired to relax display operation requirements, $B_{th}$ may be a larger value (e.g. 0.5 instead of 0.1). As $B_{th}$ becomes larger, the variation of the second illumination value before being determined not passing becomes correspondingly larger.

The computer 104 may calculate the white color uniformity of the image 124. White color uniformity means the difference in chromaticity between pixels of the image 124. Similarly to calculating white luminance uniformity, the computer 104 may actuate the LED zones to output white light. The computer may then capture the image 124, crop the image, define the first sub-zone 126 and measure the X and Y chromaticity values of the first sub-zone 126 (e.g. the first illumination value). The computer may then define the second sub-zones 128 and measure the X and Y chromaticity values of the second sub-zones (e.g., the second illumination values). The value range for white color uniformity can be used by the computer 104 to calculate the differences in the X and Y chromaticity values between sub-zones 126, 128 and is represented by equation 2:

$$\Delta W_{xy}=((W_{x1}-W_{x2})^2+(W_{y1}-W_{y2})^2)^{1/2} \qquad \text{Equation 2:}$$

where $\Delta W_{xy}$ is the change in chromaticity, $W_{x1}$ is the x chromaticity value of the first sub-area 126, $W_{x2}$ Is the x chromaticity value of the second sub-area, $W_{y1}$ is the y chromaticity value of the first sub-area, and $W_{y2}$ is the y chromaticity value of the second sub-area.

The computer 104 may compare the change in chromaticity of each second sub-area 128 to a variation threshold. The variation threshold may be determined similarly to the uniformity threshold used for white luminance uniformity. The variation threshold may be a value selected based on a desired uniformity. A larger value would correspond to a greater tolerate change in chromaticity. For example, the variation threshold may be 0.002. If the change in chromaticity for a second sub-area 128 is 0.003, then the computer 104 may determine the second sub-area as having not passed and actuate the display 110 by increasing or decreasing chromaticity as described below.

The computer 104 may actuate those LED zones of second sub-areas which are determined to be not passing based on the comparison of their change in chromaticity to the variation threshold. For example, the computer 104 may repeat the measurements after increasing each of the x and y chromaticity values of the second sub-area 128 by adjusting the color output by the LED zone of the second sub-area 128. The computer 104 may increase the x chromaticity value of the LEDs and perform the measurement again. If the change in chromaticity remains above the variation threshold, the computer 104 may then reset the x chromaticity value and increase the y chromaticity value. Further, if the change in chromaticity yet remains above the variation threshold, the computer 104 may instead decrease the x and y chromaticity values and repeat the measurements. The computer 104 may adjust the x and y chromaticity values via a rules-based system specified during development of the computer 104 (e.g., adjust the value by 5% and then repeat measurements).

Figure 4:
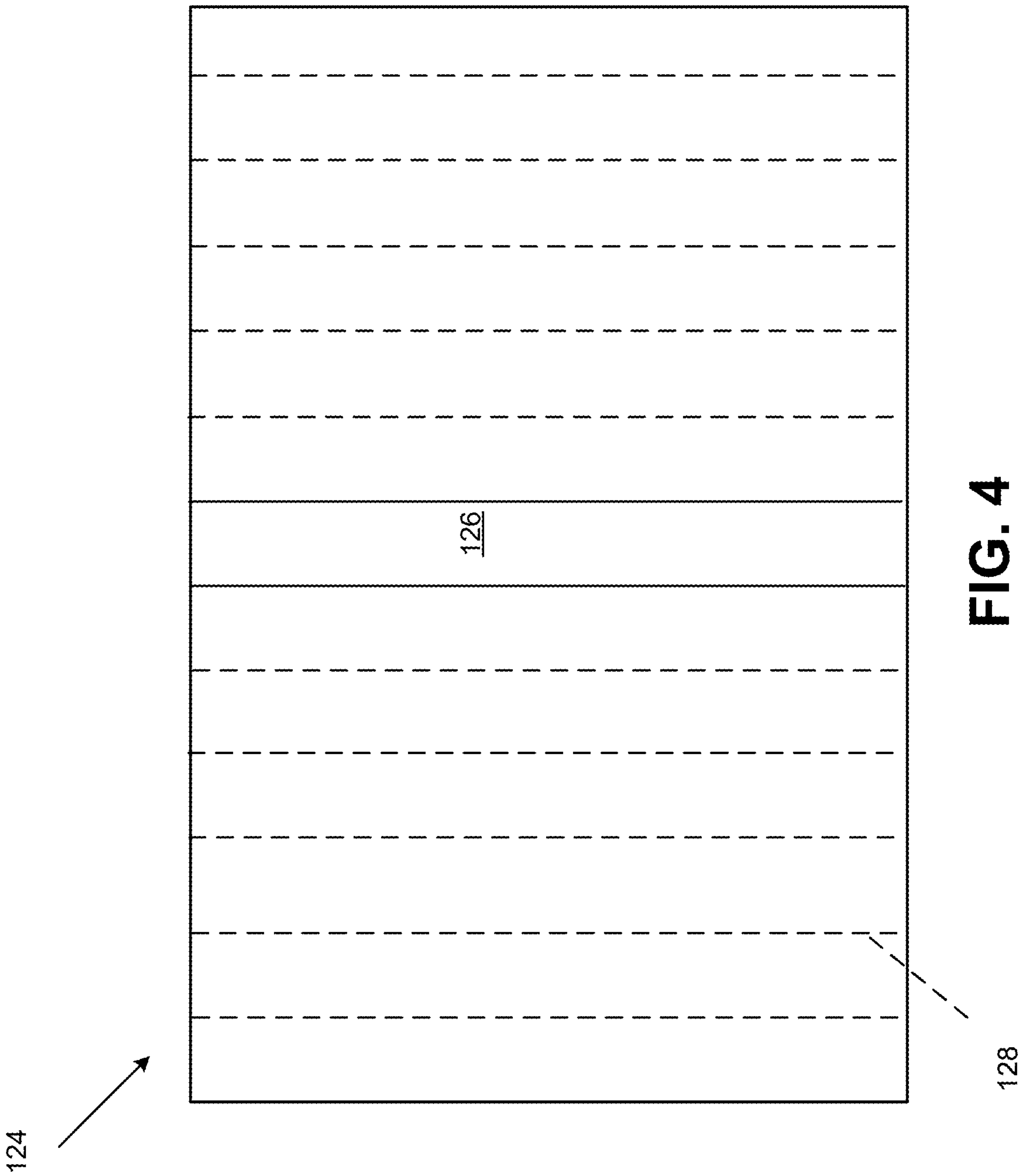
FIG. 4 illustrates an example image of the display with sub-areas.

Referring now to FIG. 4, the computer 104 may define the first sub-area 126 and the second sub areas 128 as vertical columns (though not shown, the sub-areas 126, 128 may alternatively be defined as horizontal rows). The first sub-area 126 is the column centered on the image 124, while the second sub-areas 128 extend to the left and right of the first sub-area 126 such that the whole image 124 is divided into the nonoverlapping sub-area columns.

The computer 104 may calculate the grid mura luminance uniformity. As used herein, grid mura luminance uniformity means unevenness in luminance among the sub-areas 126, 128. "unevenness" means the contrast of each pixel is below a threshold. The threshold may be determined during development of the computer 104 based on whatever amount of mura is deemed to be visually acceptable. Grid mura is generally caused by unoptimized optical cavity designs in LCD displays.

The computer may actuate the LED zones to output white light, capture the image 124, and crop the image 124. The computer may then define the first and second sub-areas 126, 128. The first sub-area may be a horizontal column including those pixels between a top edge of the image 126 and a bottom edge of the image and centered on the image 126. Similarly, the second sub-areas 128 may be horizontal columns including the remaining pixels of the image 124 not included in the first sub-area 126. The second sub-areas 128 may thus extend to the left and right of the first sub-area 126. The computer 104 may then measure the luminance of the first and second sub-areas 126, 128 (i.e., first and second illumination values respectively).

The computer 104 may normalize the sub-areas 126, 128 after defining the sub-areas 126, 128. That is, the computer 104 may find the average luminance of each sub-area 126, 128 by adding together (i.e., summing) the luminance of all pixels in the respective sub-area 126, 128, and then dividing by the total number of pixels in the sub-area 126, 128. The average luminance is then applied to the sub-area 126, 128 (i.e., the computer 104 treats all pixels in the sub-area 126, 128 as having the average luminance). The average luminance of each sub-area 126, 128 may then be divided by the maximum luminance present in the sub-area 126, 128.

The computer 104 may next, after normalizing the sub-areas 126, 128, smooth the pixels of the normalized sub-areas 126, 128. Smoothing herein means adding the luminance of the pixels in a small neighborhood of pixels in a moving window (e.g., an area of pixels moved about the image 124 by the computer 104) and dividing the sum by the number of pixels (e.g., taking the average) and replacing the illumination value of the center pixel of the window with the average. As an example, the moving window can be a one-dimensional array including 3 or 5 pixels. Smoothing the pixels yields a smoothing line representing the relative luminance values of adjacent sub-areas 126, 128.

The computer 104 may calculate the luminance differences between the normalized sub-areas illumination values and the smooth sub-areas illumination values. Luminance differences may be calculated using equation 3:

$$\Delta L_i=(L_i-L_{ismooth})*1000 \quad \text{Equation 3:}$$

where $\Delta L_i$ is the luminance difference, $L_i$ is the luminance of the normalized sub-areas 126-128, and $L_{ismooth}$ is the luminance of the smoothed sub-areas 126-128.

The computer may calculate a Grid Mura Index (GMI). The GMI is calculated according to equation 4:

$$GMI=(\Sigma\Delta L_i)/N \quad \text{Equation 4:}$$

Where N is the total horizontal resolution of the sensor 106.

The computer 104 may determine all sub-areas 126, 128 (e.g., the entire display 110) as having passed or not passed based on comparing the illumination values to the GMI. That is, where the illumination value exceeds the GMI, the computer 104 may determine all sub-areas 126, 128 as not passing. The computer 104 may then actuate the display to meet a desired GMI target based on judging (e.g. determining) one or more sub-areas 126, 128 as not passing. For example, the computer 104 can determine a ratio of the GMI for a sub-area 126, 128 to the GMI of the whole image 124. The computer 104 can then multiply the pixels of the not passing sub-areas 126, 128 by the determined ratio to make the GMIs for all sub-areas 126, 128 equal before performing the measurements again.

Example Processes

Figure 5:
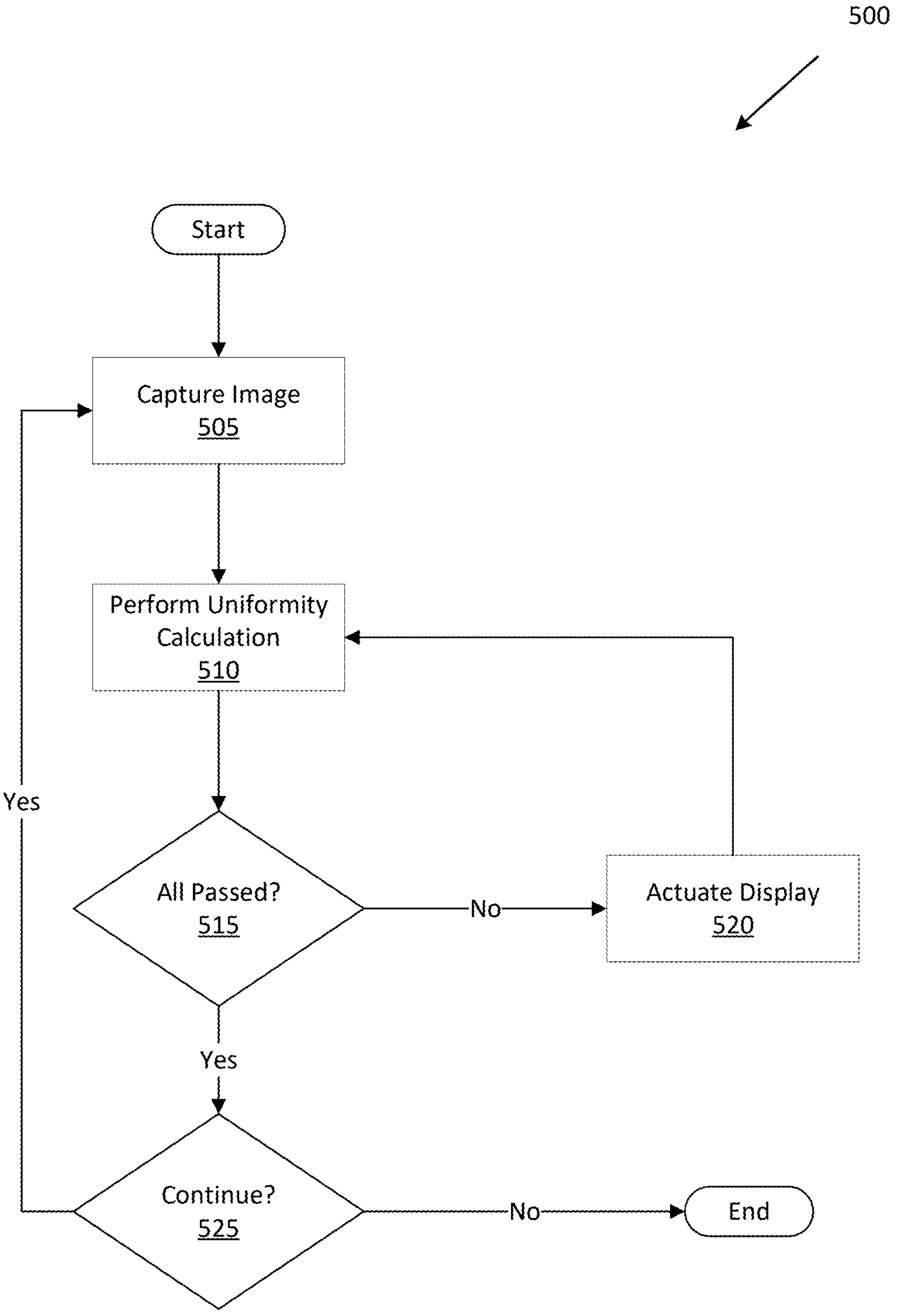
FIG. 5 is a flowchart of an example process to actuate the display.

FIG. 5, described with reference to FIGS. 1-4, illustrates an example process 500 by which the computer 104 may determine the uniformity of the image 124 and actuate the display 110. The process can be carried out according to program instructions executed by the computer 104.

The process begins in a block 505, in which the computer 104 receives instructions indicating which uniformity calculation to perform (e.g. white luminance uniformity, black luminance uniformity, white color uniformity, grid mura luminance uniformity). The instructions may be based on user input. The computer 104 may present a prompt or menu item on the display 110 or on a remote device 118 to allow the user to the computer 104 to perform processing to optimize the display 110. Additionally, or alternatively, the computer 104 may perform the calculations of the process 500 based on stored instructions. The stored instructions may instruct the computer 104 to continuously or periodically execute the process 500 for one or more uniformity calculations and actuate the display 110 accordingly as described above based on sub-areas 126, 128 determined to be not passing.

Next, in a block 510, the computer 104 receives the image 124 of the display from a camera sensor 106.

Next, in a block 515, the computer performs a uniformity calculation. The uniformity calculation to be performed is the uniformity calculation indicated in the received instructions of the block 505. The computer 104 may calculate one of white luminance uniformity (represented by process 600), black luminance uniformity (represented by process 700), white color uniformity (represented by process 800), or grid mura luminance uniformity (represented by process 900) as specified in block 505. Formulae for performing uniformity calculations can be developed as described above and stored in a memory of the computer 104.

Next, in a decision block 520, the computer 104 determines whether all sub-areas 126, 128 of the image have been determined to pass, i.e., are within a uniformity value range, or whether any have not passed. If any sub-areas 126, 128 are determined to not pass, the process continues to a block 525. Otherwise the process continues to a block 530.

In a block 525, the computer 104 has determined at least one and possibly more sub-areas 126, 128 as not passing. The computer 104 then actuates the display (e.g. decreasing or increasing brightness of LEDs of the LED zones associated with not passing sub-areas 126, 128) according to the specified actuations for respective uniformity calculations described above. The process 500 then returns to block 515 such that the computer 104 may determine whether the actuation has put all sub-areas in a passing state.

Next, in a block 530, the computer 104 determines whether to continue the process 500. For example, once the process 500 is initiated, the computer 104 could be instructed to perform another uniformity calculation or reperform the same uniformity calculation by returning to block 505. However, the process 500 could end upon some input or event to terminate the process 500 such as a user ceasing operation of the computer 104 (e.g., turning off a propulsion system such as an engine of a vehicle 102 if the computer 104 is a vehicle computer 104), a user providing input to end the process 500, etc. If the process 500 is to continue, then the process returns to block 505. Otherwise, the process 500 ends.

Figure 6:
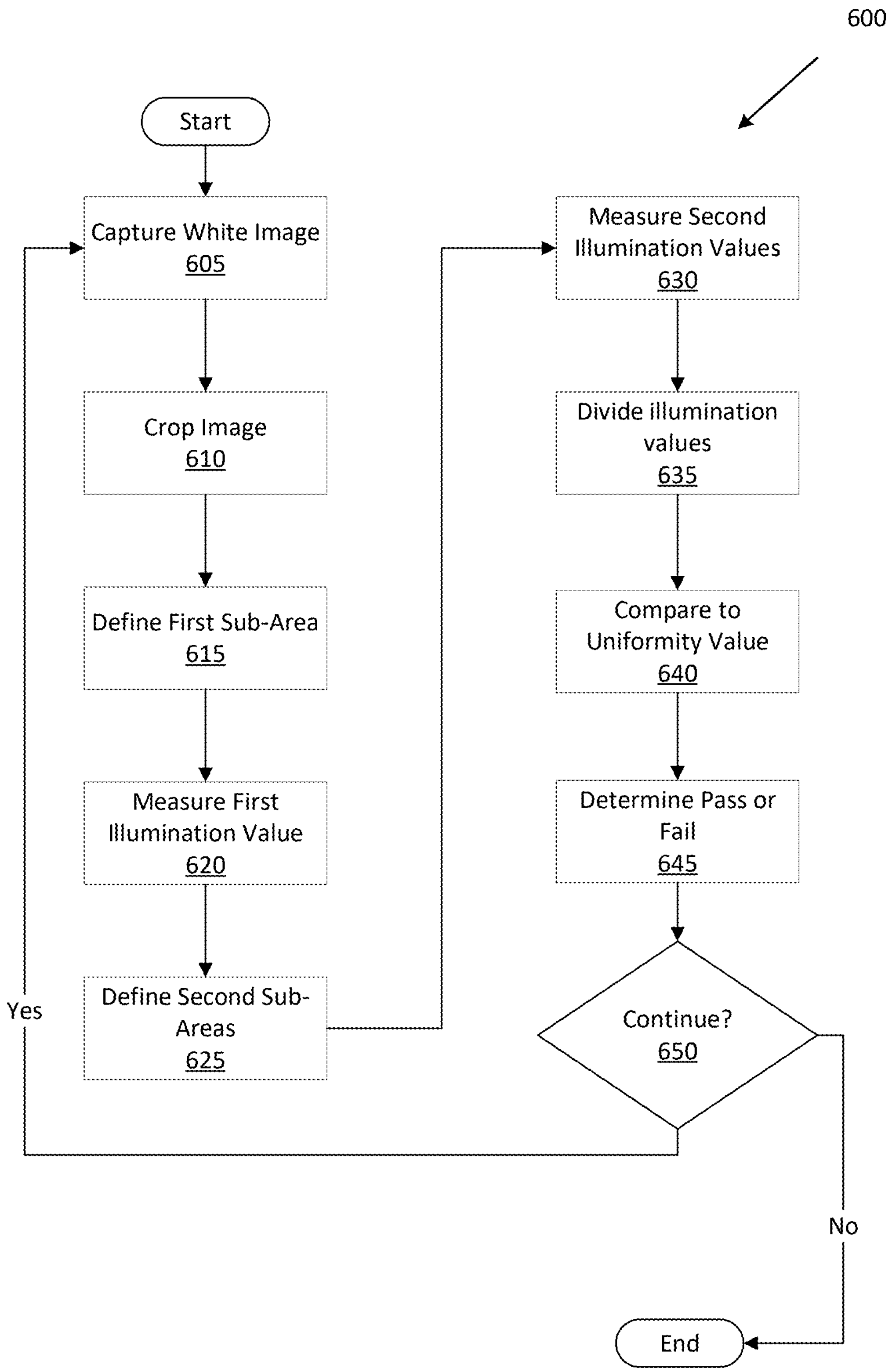
FIG. 6 is a flowchart of an example process to determine white luminance uniformity of an image.

FIG. 6, described with reference to FIGS. 1-4, illustrates an example process 600 by which the computer 104 may calculate the white luminance uniformity of the image 124. The process can be carried out according to program instructions executed by the computer 104.

The process begins in block 605 in which the computer 104 actuates the LED zones to output white light and actuates the sensor 106 to capture an image 124 of the display 110.

Next, in a block 610, the computer 104 crops the edges of the image 124.

Next, in a block 615, the computer 104 defines the first sub-area 126. The first sub-area is a rectangular area centered on the center of the image 124.

Next, in a block 620, the computer 104 measures the first illumination value of the first sub-area 126. That is, the computer 104 measures the luminance of all pixels within the first-sub area 126 and finds the average luminance.

Next, in a block 625, the computer 104 defines the second sub-areas 128. Each second sub-area 128 may each individually include less than all pixels of the image 124, but all pixels of the image 124 are included in one of the second sub-areas 128 (some pixels may also be included in the first sub-area 126 as well as some of the second sub-areas 128). The second sub-areas 128 may overlap with the first sub-area 126.

Next, in a block 630, the computer 104 measures the second illumination values of the second sub-areas 128. That is, the computer 104 measures the luminance of all pixels within the respective second sub-areas 128 and finds the average luminance.

Next, in a block 635, the computer 104 divides the second illumination values by the first illumination value as per equation 1 to determine the uniformity value of each sub-area 128.

Next, in a block 640, the computer 104 compares the uniformity values to the uniformity threshold.

Next, in a block 645, the computer 104 determines whether sub-areas 128 pass or not pass based on their uniformity value. Those sub-areas 128 having uniformity values below the uniformity threshold are determined to not pass, and those have uniformity values above the uniformity threshold are determined to pass.

Next, in a block 650, the computer 104 determines whether to continue the process 600. For example, once the process 600 is initiated, the computer 104 could continue to capture images 124 by returning to block 605. However, the process 600 could end upon some input or event to terminate the process 600 such as a user ceasing operation of the computer 104 (e.g., turning off a propulsion system such as an engine of the vehicle 102), a user providing input to end the process 600, etc. If the process 600 is to continue, then the process returns to block 605. Otherwise, the process 600 ends.

Figure 7:
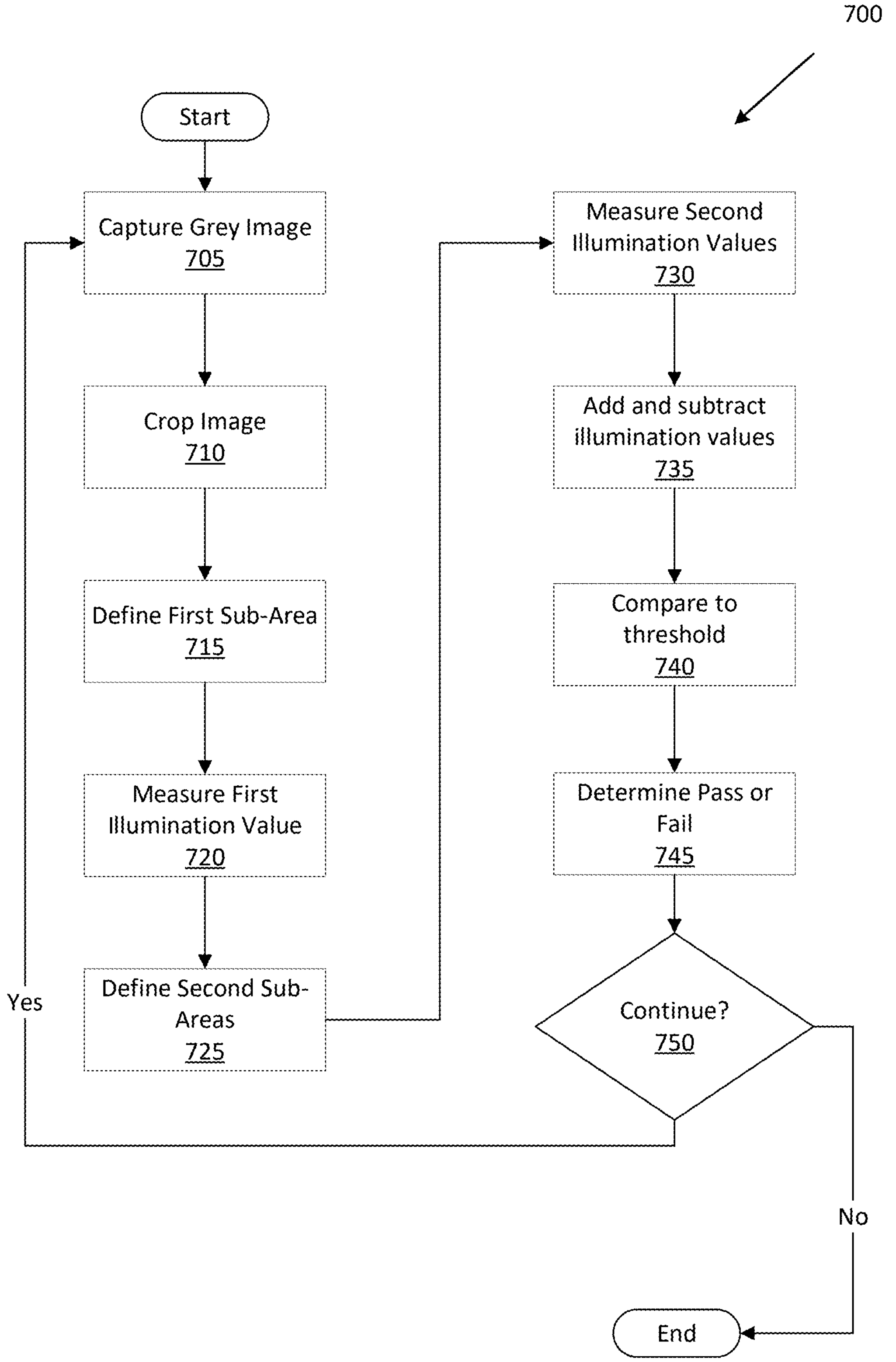
FIG. 7 is a flowchart of an example process determine black luminance uniformity of an image.

FIG. 7, described with reference to FIGS. 1-4, illustrates an example process 700 by which the computer 104 may calculate the black luminance uniformity of the image 124. The process can be carried out according to program instructions executed by the computer 104.

The process begins in block 705 in which the computer 104 actuates the LED zones to output grey light and actuates the sensor 106 to capture an image 124 of the display 110.

Next, in a block 710, the computer 104 crops the edges of the image 124.

Next, in a block 715, the computer 104 defines the first sub-area 126. The first sub-area is a rectangular area centered on the center of the image 124.

Next, in a block 720, the computer 104 measures the first illumination value of the first sub-area 126. That is, the computer 104 measures the luminance of all pixels within the first-sub area 126 and finds the average luminance.

Next, in a block 725, the computer 104 defines the second sub-areas 128.

Next, in a block 730, the computer 104 measures the second illumination values of the second sub-areas 128. That is, the computer 104 measures the luminance of all pixels within the respective second sub-areas 128 and finds the average luminance.

Next, in a block 735, the computer 104 subtracts the threshold luminance value from the first illumination value and adds the threshold luminance value to the first illumination value to define the range of values within which the second illumination values may be determined by the computer 104 to be passing.

Next, in a block 740, the computer 104 compares the second illumination values to the range determined in block 735.

Next, in a block 745, the computer 104 determines whether sub-areas 128 pass or not pass based on their uniformity value. Those sub-areas 128 having second illumination values within the range determined in block 735 may be determined to pass. Those sub-areas 128 having second illumination values outside the range determined in block 735 are determined to not pass.

Next, in a block 750, the computer 104 determines whether to continue the process 600. For example, once the process 700 is initiated, the computer 104 could continue to capture images 124 by returning to block 705. However, the process 700 could end upon some input or event to terminate the process 700 such as a user ceasing operation of the computer 104 (e.g., turning off a propulsion system of a such as an engine of a vehicle 102), a user providing input to end the process 700, etc. If the process 700 is to continue, then the process returns to block 705. Otherwise, the process 700 ends.

Figure 8:
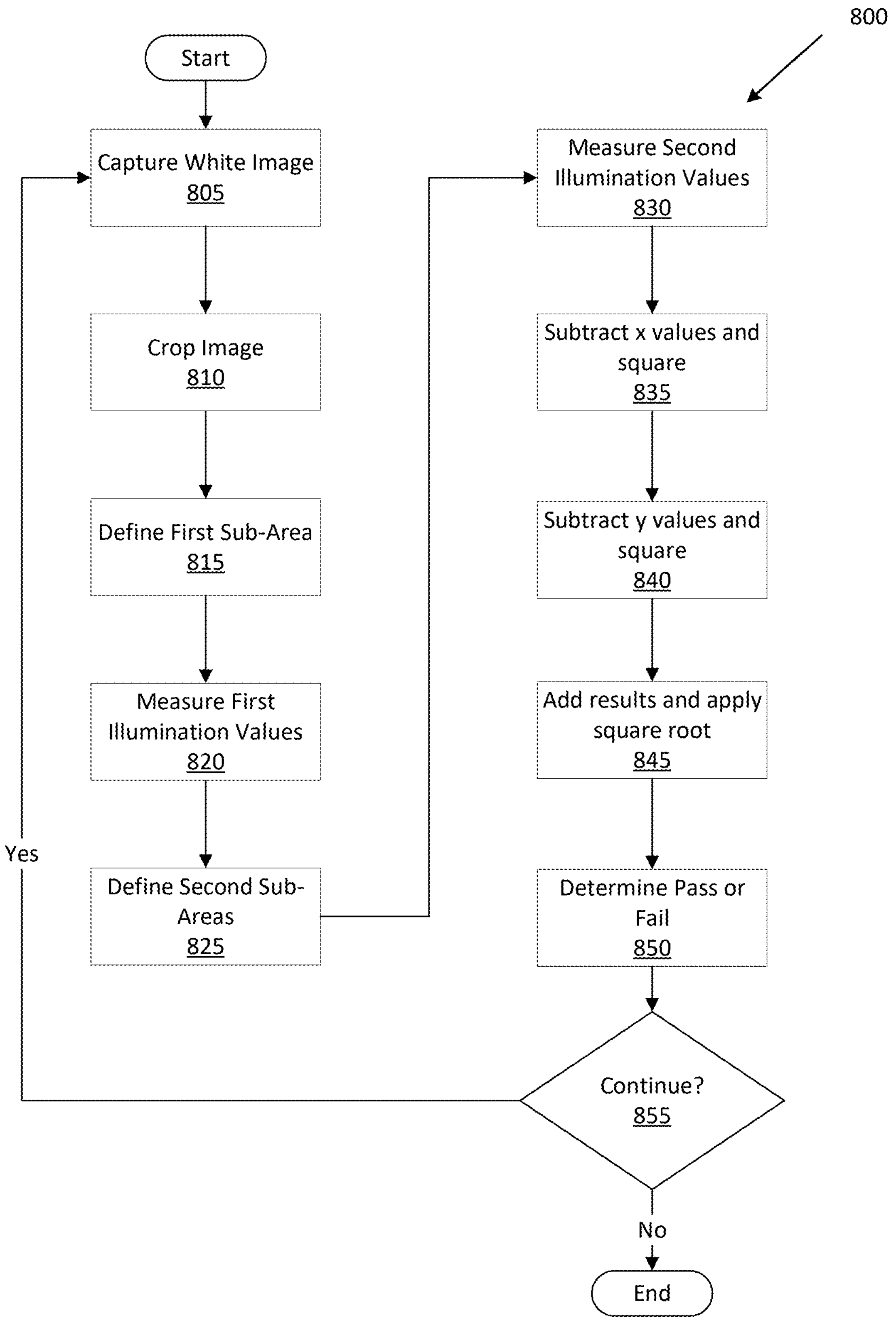
FIG. 8 is a flowchart of an example process to determine white color uniformity of an image.

FIG. 8, described with reference to FIGS. 1-4, illustrates an example process 800 by which the computer 104 may calculate the white color uniformity of the image 124. The process can be carried out according to program instructions executed by the computer 104.

The process begins in block 805 in which the computer 104 actuates the LED zones to output white light and actuates the sensor 106 to capture an image 124 of the display 110.

Next, in a block 810, the computer 104 crops the edges of the image 124.

Next, in a block 815, the computer 104 defines the first sub-area 126. The first sub-area is a rectangular area centered on the center of the image 124.

Next, in a block 820, the computer 104 measures the first illumination value of the first sub-area 126. That is, the computer 104 measures the luminance of all pixels within the first-sub area 126 and finds the average luminance.

Next, in a block 825, the computer 104 defines the second sub-areas 128.

Next, in a block 830, the computer 104 measures the second illumination values of the second sub-areas 128. That is, the computer 104 measures the luminance of all pixels within the respective second sub-areas 128 and finds the average luminance.

Next, in a block 835, the computer 104 subtracts the x chromaticity value of the second sub-area 128 from the x chromaticity value of the first sub-area 126 and squares the result.

Next, in a block 840, the computer 104 subtracts the y chromaticity value of the second sub-area 128 from the y chromaticity value of the first sub-area 126 and squares the result.

Next, in a block 845, the computer 104 adds the results of blocks 835 and 840 to determine the change in Chromaticity Next, in a block 850, the computer 104 compares the change in chromaticity of each second sub-area 128 to the variation threshold. The computer 104 determines those sub-areas 128 having chromaticity changes that exceed the variation threshold to not pass, and those sub-areas 128 which do not have chromaticity changes that exceed the variation threshold are determined to pass.

Next, in a block 855, the computer 104 determines whether to continue the process 800. For example, once the process 800 is initiated, the computer 104 could continue to capture images 124 by returning to block 805. However, the process 800 could end upon some input or event to terminate the process 800 such as a user ceasing operation of the computer 104 (e.g., turning off a propulsion system such as an engine of a vehicle 102), a user providing input to end the process 800, etc. If the process 800 is to continue, then the process returns to block 805. Otherwise, the process 800 ends.

Figure 9:
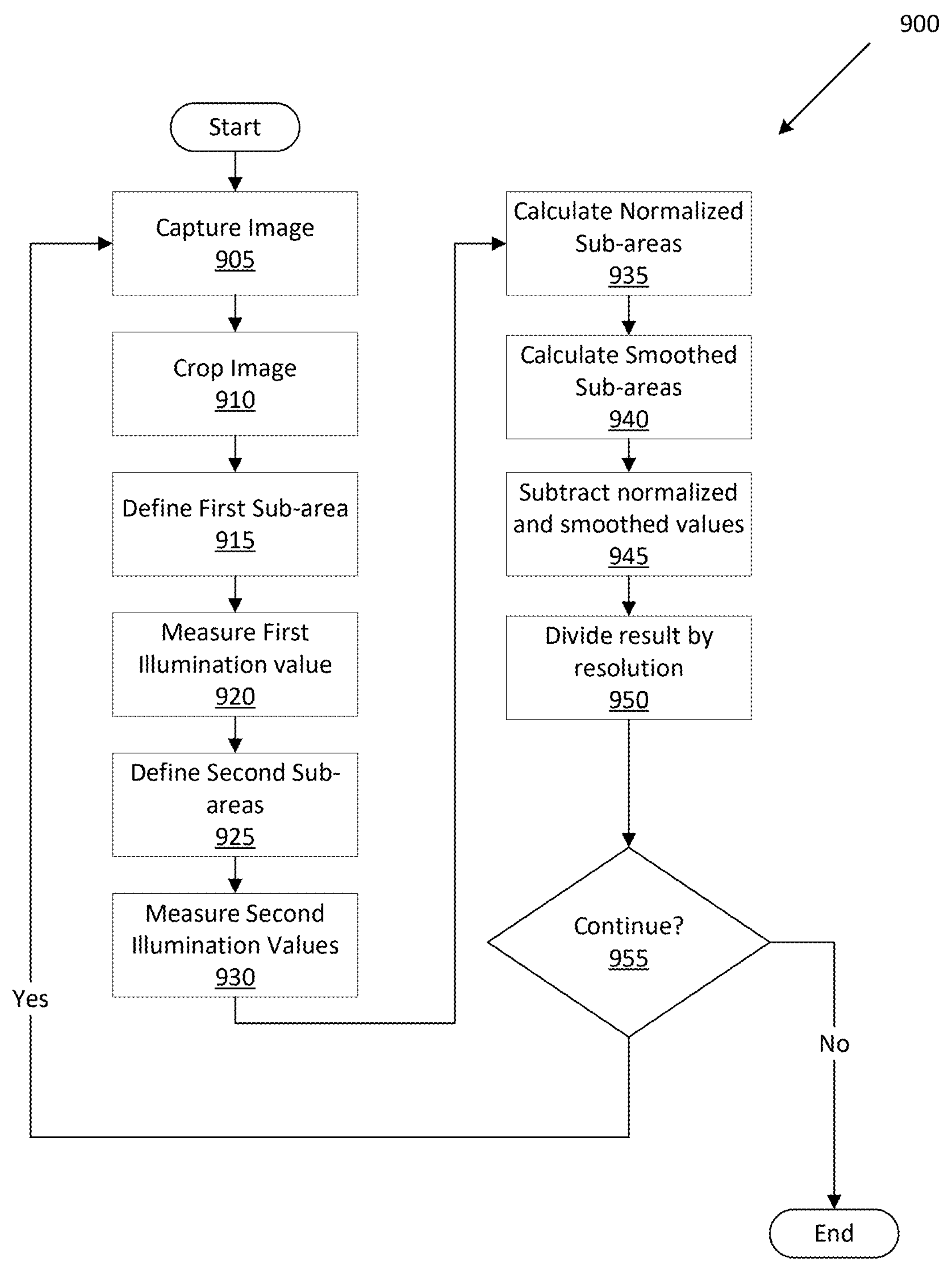
FIG. 9 is a flowchart of an example process to determine an index of an image.

FIG. 9, described with reference to FIGS. 1-4, illustrates an example process 900 by which the computer 104 may calculate the Grid Mura luminance uniformity of the image 124. The process can be carried out according to program instructions executed by the computer 104.

The process begins in block 905 in which the computer 104 actuates the LED zones to output white light and actuates the sensor 106 to capture an image 124 of the display 110. Next, in a block 910, the computer 104 crops the edges of the image 124.

Next, in a block 915, the computer 104 defines the first sub-area 126. The first sub-area is a vertical column area centered on the image 124.

Next, in a block 920, the computer 104 measures the first illumination value of the first sub-area 126. That is, the computer 104 measures the luminance of all pixels within the first-sub area 126 and finds the average luminance.

Next, in a block 925, the computer 104 defines the second sub-areas 128.

Next, in a block 930, the computer 104 measures the second illumination values of the second sub-areas 128. That is, the computer 104 measures the luminance of all pixels within the respective second sub-areas 128 and finds the average luminance.

Next, in a block 935, the computer 104 calculates the normalized sub-areas 126, 128.

Next, in a block 940, the computer 104 calculates the smoothed sub-areas 126, 128 by dividing the added luminance of pixels by the number of pixels.

Next, in a block 945, the computer 104 calculates the luminance difference as per equation 3.

Next, in a block 950, the computer 104 calculates the grid-mura difference as per Equation 4 and compares the sub-areas 126, 128 to the grid-mura index. The computer 104 determines whether all sub-area s126, 128 (e.g. the entire display 110) have passed or not passed.

Next, in a block 955, the computer 104 determines whether to continue the process 900. For example, once the process 900 is initiated, the computer 104 could continue to capture images 124 by returning to block 905. However, the process 900 could end upon some input or event to terminate the process 900 such as a user ceasing operation of the computer 104 (e.g., turning off a propulsion system such as an engine of a vehicle 102), a user providing input to end the process 900, etc. If the process 900 is to continue, then the process returns to block 905. Otherwise, the process 900 ends.

Operations, systems, and methods described herein should always be implemented and/or performed in accordance with an applicable user's manual.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. Of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computing device, the computing device including a processor and a memory, the memory storing instructions executable by the processor, including instructions to:
- determine a first illumination value based on a first sub-area of an image of a display, the display including LED zones, the first sub-area being centered on the image;
- define a plurality of second sub-areas of the image based on the LED zones;
- determine second illumination values of the second sub-areas;
- compare the second illumination values to a value range, the value range being defined by at least one of an addition and a subtraction of the first illumination value and a threshold value; and
- based on comparing the second illumination values to the value range, actuate the display.

2. The system of claim 1, the instructions including further instructions to assign the second sub-areas a uniformity value, the uniformity value being based on the value range.

3. The system of claim 2, wherein the uniformity value is a result of dividing the second illumination values by the first illumination values.

4. The system of claim 1, wherein the value range is defined by a result of dividing the second illumination values by the first illumination values.

5. The system of claim 1, wherein the value range is defined by a result of dividing a summation of differences between second illumination values by a resolution of a camera.

6. The system of claim 5, wherein the differences between second illumination values are found by subtracting, from the second illumination values of the second sub-areas, the second illumination values of the second sub-areas after applying smoothing to the second illumination values.

7. The system of claim 1, wherein the second illumination values are luminance measured in nits.

8. The system of claim 1, wherein the second illumination values are chromaticity.

9. The system of claim 1, wherein actuating the display includes at least one of increasing or decreasing a brightness of some of the LED zones.

10. The system of claim 1, the instructions including further instructions to remove a plurality of pixels from a border of the image prior to determining the first illumination value.

11. A method comprising:
- determining a first illumination value based on a first sub-area of an image of a display, the display including a liquid crystal display (LCD) backlit by light emitting diodes (LEDs) arranged in LED zones, the first sub-area being centered on the image;
- defining a plurality of second sub-areas of the image based on the LED zones;
- determining second illumination values of the second sub-areas;
- comparing the second illumination values to a value range, the value range being defined by at least one of an addition and a subtraction of the first illumination value and a threshold value; and
- based on comparing the second illumination values to the value range, actuating the display.

12. The method of claim 11, further comprising assigning the second sub-areas a uniformity value, the uniformity value being based on the value range.

13. The method of claim 12, wherein the uniformity value is a result of dividing the second illumination values by the first illumination values.

14. The method of claim 11, wherein the value range is defined by a result of dividing the second illumination values by the first illumination values.

15. The method of claim 11, wherein the value range is defined by a result of dividing a summation of differences between second illumination values by a resolution of a camera.

16. The method of claim 15, wherein the differences between second illumination values are found by subtracting, from the second illumination values of the second sub-areas, the second illumination values of the second sub-areas after applying smoothing to the second illumination values.

17. The method of claim 11, wherein the second illumination values are luminance measured in nits.

18. The method of claim 11, wherein the second illumination values are chromaticity.

19. The method of claim 11, wherein actuating the display includes at least one of increasing or decreasing a brightness of some of the LED zones.

20. The method of claim 11, further comprising removing a plurality of pixels from a border of the image, prior to determining the first illumination value.

* * * * *